United States Patent
Lykkegaard et al.

(10) Patent No.: US 9,555,447 B2
(45) Date of Patent: Jan. 31, 2017

(54) METHOD FOR INDUCTING AND SINGULATING ITEMS TO A SORTER

(71) Applicant: BEUMER Group A/S, Aarhus N (DK)

(72) Inventors: Uffe Lykkegaard, Aarhus C (DK); Jørgen Staun, Hinnerup (DK)

(73) Assignee: Beumer Group A/S, Aarhus N (DK)

( * ) Notice: Subject to any disclaimer, the term of this patent is extended or adjusted under 35 U.S.C. 154(b) by 0 days.

(21) Appl. No.: 14/916,753

(22) PCT Filed: Sep. 6, 2013

(86) PCT No.: PCT/DK2013/050283
§ 371 (c)(1),
(2) Date: Mar. 4, 2016

(87) PCT Pub. No.: WO2015/032402
PCT Pub. Date: Mar. 12, 2015

(65) Prior Publication Data
US 2016/0199884 A1    Jul. 14, 2016

(51) Int. Cl.
*B07C 5/02*     (2006.01)
*B07C 3/00*     (2006.01)
(Continued)

(52) U.S. Cl.
CPC ............ *B07C 5/02* (2013.01); *B07C 3/003* (2013.01); *B25J 9/0093* (2013.01); *G05B 19/4182* (2013.01); *B07C 2501/0063* (2013.01)

(58) Field of Classification Search
CPC ............ B07C 5/02; B07C 3/003; B25J 9/0093
See application file for complete search history.

(56) References Cited

U.S. PATENT DOCUMENTS 5,040,056 A * 8/1991 Sager .................... B25J 9/0093
                                                                  348/88
5,041,907 A * 8/1991 Sager .................... B07C 5/3422
                                                                  348/91
(Continued)

FOREIGN PATENT DOCUMENTS

DE    10 2009 060 551 A1    6/2011
EP          2 059 467 B1    5/2009
(Continued)

OTHER PUBLICATIONS

International Search Report for PCT/DK2013/050283 dated Apr. 25, 2014.

*Primary Examiner* — Thomas Randazzo
(74) *Attorney, Agent, or Firm* — Knobbe Martens Olson & Bear LLP

(57) ABSTRACT

The invention provides a method and a system for inducting items to a sorter (SRT) from a stream of items (IT1, IT2), e.g. mail or parcels, arriving at a feeding conveyor (FC). A processor (PCR) executes a control algorithm (C_A) with at least information (I_1) regarding the stream of items arriving at the feeding conveyor (FC) as input. In response, the control algorithm (C_A) generates an output (O1) indicating where to place an item picked up by a robot (R1) from the feeding conveyor (FC). The control algorithm (C_A) selects between two or more of: 1) a first induction (I1) arranged for transporting items to the sorter (SRT), 2) an empty space (E_S) on the sorter (SRT), 3) the feeding conveyor (FC), e.g. singulating bulk items on the feeding conveyor (FC), and 4) a weighing unit (W1) arranged for weighing items. By controlling the robot (R1) accordingly, it is possible to provide effective use of existing pick-and-place robots as part of a sorter induction system, where a high capacity can be obtained with a small requirement for space. E.g. it may be possible to save space for inductions, compared to what (Continued)

is required for manual handling with the same sorting capacity, especially this may be advantageous for items with a maximum weight of 2-3 kg.

25 Claims, 3 Drawing Sheets

(51) Int. Cl.
*B25J 9/00* (2006.01)
*G05B 19/418* (2006.01)

(56) References Cited

U.S. PATENT DOCUMENTS

| | | | |
|---|---|---|---|
| 8,958,912 B2 * | 2/2015 | Blumberg | B25J 9/0087 |
| | | | 700/259 |
| 9,095,978 B2 * | 8/2015 | Shi | B25J 9/1633 |
| 9,403,279 B2 * | 8/2016 | Smith | B25J 13/003 |

FOREIGN PATENT DOCUMENTS

| | | | |
|---|---|---|---|
| EP | 2 102 080 B1 | 9/2009 | |
| EP | 2 112 104 A2 | 10/2009 | |
| WO | WO 91/11885 A1 | 8/1991 | |
| WO | WO 9111885 A1 * | 8/1991 | ............ H04N 7/18 |
| WO | WO 2012/116690 A1 | 9/2012 | |

* cited by examiner

METHOD FOR INDUCTING AND SINGULATING ITEMS TO A SORTER

CROSS REFERENCE TO RELATED APPLICATIONS

This application is a U.S. National Phase Application of PCT International Application Number PCT/DK2013/050283, filed on Sep. 6, 2013, designating the United States of America and published in the English language. The disclosures of the above-referenced applications are hereby expressly incorporated by reference in their entireties.

FIELD OF THE INVENTION

The invention relates to the field of handling and sorting of objects or materials, such as mail, parcels or other type of items. In particular, the invention provides a method and a system for inducting items to a sorter.

BACKGROUND OF THE INVENTION

Sorters, such as for sorting mail and/or parcels or the like, normally include a sorter system for transporting items at a constant speed to a discharge position, and in accordance with a code or the like on the individual items, the items are received and discharged from the sorter at a given discharge position. Items are often inducted to the sorter from a number of inductions which receive an item in one end and they serve to accelerate the item and deliver the item at an empty space on the sorter. An induction accelerates an item up to a velocity with a directional component parallel with the sorter velocity, which equals or at least approximately equals the sorter velocity. The inductions are often manually loaded with items, i.e. a person picks up individual items from a feeding conveyor, either from a bulk or singulated, and places them on an induction, or on a weighing unit adjacent to an induction. In sorter systems without automated inductions for handling the induction to the sorter, persons perform the rather unpleasant task of manually inducting items to the sorter.

However, with manual handling, it is not immediately possible to increase the speed of the sorter in order to increase capacity, i.e. increase the number of items handled per time. Manual handling requires more persons participating in the handling process. Adapting the sorter system for involving more persons in manual handling for speeding up requires allocation of extra space, e.g. in the form of a longer feeding conveyor, and an increased number of inductions which all occupy a significant amount of space.

SUMMARY OF THE INVENTION

Thus, according to the above description, it may be seen as an object of the present invention to provide a method and a sorter system allowing a higher sorting capacity at a given space available.

In a first aspect, the invention provides a method of inducting items to a sorter from a stream of items arriving at a feeding conveyor, the method comprising
  providing a plurality of input parameters comprising at least:
    information regarding the stream of items arriving at the feeding conveyor,
  processing said input parameters in a processor according to a control algorithm, wherein the control algorithm is arranged to generate at least one output, in response to said input parameters, indicating where to place an item, selecting between at least two of:
    a first induction arranged for transporting items to the sorter,
    an empty space on the sorter,
    the feeding conveyor, but at a different position and/or orientation than where it was picked up, and
    a weighing unit arranged for weighing items, and
  controlling at least a first robot in accordance with the output of the control algorithm, wherein the first robot is arranged to pick up an item from the feeding conveyor, and to place the item in accordance with the output of the control algorithm.

Such method is advantageous, since it allows induction of items to a sorter at a high speed, with a minimum amount of floor space required for the robot itself, since robots are available with a high speed capability and with a large reaching range, compared to a person. Even though there is a long distance between the pick up place at the feeding conveyor and a target place, the robot may be capable of selecting to place an item on an induction, or a weighing unit adjacent to an induction, or directly on the sorter. A corresponding distance between pick up place and target place may be out of reach of a person. Thus, with the induction method, it is possible to increase induction capacity without increasing the required space compared to manual handling. Further, it is possible to provide a control algorithm that allows automated operation of the induction to the sorter without, or at least with a limited, surveillance by a person.

With the possibility of directly placing items on empty spaces on the running sorter, it may even be possible to reduce the number or inductions, since the control algorithm may be configured to select to directly place items on the sorter whereever the robot is capable of taking time to, and can reach an empty space on the sorter to place an item. With information about upstream items arriving at the feeding conveyor and information from the sorter regarding empty spaces, the control algorithm may be arranged to plan the work for the robot such that it has the time to place the most items directly on the sorter. In cases where the control algorithm controls two or more robots positioned along the same feeding conveyor, the control algorithm may be arranged to coordinate the work for the robots such that they altogether obtain an optimal handling, based on the input information available. This may, at certain times, include controlling one robot to singulate a bulk of items arriving at the feeding conveyor so as to facilitate the task of selecting and picking up items for one or more downstream positioned robots. Still, there may be special items that can not be handled by robots, or the robot may not have the capacity to handle all incoming items on the feeding conveyor, and in these cases the robot may let such items pass by on the feeding conveyor, where it can be handled manually by a person positioned downstream of the robot.

By 'robot' is understood a controllable device with a manipulator arm, preferably having at least 2 joints or axes. It is to be understood that at least the first robot is preferably designed to be capable of picking up at least the items being within the required size and shape in question, and capable of reaching the desired position where to place the item. Thus, the first robot should be selected to be capable of handling the type of items to be picked up and moved.

Pick-and-place robots capable of picking up an upper most item from a bulk of items or a stream of singulated items are available, e.g. from companies such as Omron™ or Motoman™ etc. Such robots can operate at a high speed, and they are available with manipulation arms with several joints and axes, e.g. 3 axes or more, that are capable of reaching several meters between a pick and place position, even though they are mounted with a fixed base, e.g. a base fixed to a wall, a ceiling or a the floor. Such fixed base robots may be seen as advantageous since they save space compared to robots capable of moving around freely or moving along a fixed track etc.

The control algorithm may be arranged to generate the output, in response to said input parameters, indicating where to place an item, selecting between two, three or all four of:
- a first induction arranged for transporting items to the sorter,
- an empty space on the sorter,
- the feeding conveyor, but at a different position and/or orientation than where it was picked up, and
- a weighing unit arranged for weighing items.

In one specific embodiment, the control algorithm may select only between placing an item on the induction or directly on an empty space on the sorter. Even though the control algorithm selected only between two places to place the item, the selection may be performed based on a predetermined selection criterion taking into account a number of input parameters derived from various input information. E.g. the final selection is based on a calculated score for each of the possible places, e.g. wherein the score for each place is calculated based on a weighted sum of parameters. If the control algorithm controls two or more robots, the selection preferably includes input parameters indicative of the activity of at least one of the other robots, so as to ensure that the robots cooperate to obtain the best possible efficiency with the given incoming items and the given empty space(s) available on induction(s) and sorter.

The method may comprise selecting an item to be picked up by the first robot, from a plurality of items available on the feeding conveyor, in response to the plurality of input parameters. This may comprise selecting the upper most item in case of a bulk of items before picking up singulated items. E.g. the strategy behind selecting the next item to be picked up may be influenced by possible additional robots downstream of the first robot, thus the first robot may be controlled to perform singulation rather than picking up items.

The plurality of input parameters may further comprise at least one of:
- information regarding an empty space on the sorter,
- information regarding an empty space for at least one item on the induction,
- information regarding an empty space for at least one item on a second induction,
- information regarding characteristics of the one or more items arriving on the feeding conveyor, wherein the characteristics comprise at least one of: a shape, a weight, a size, a center of gravity, an orientation, a surface property, and whether or not the item is a top most item in a bulk,
- information indicative of a position of an empty space on the sorter, and
- information indicative of a velocity of an empty space on the sorter.

The plurality of input parameters may especially comprise one, two, three, four, five, or all six of the above-mentioned inputs. Based on the inputs available, the control algorithm can be configured to optimize the induction process for the first robot and possibly one or more additional robots according to an optimization criterion. Especially, the inputs are taken into account in the selection of next items to be picked up, as well as selection of where to place an item picked up.

It is to be understood that relative positions of the feeding conveyor, the first robot, the induction(s), and possible positions of weighing units, the speed and reaching range of the first robot, are also preferably taken into account as (non-dynamic) inputs to the control algorithm. The other above-mentioned inputs are dynamic inputs which are preferably taken into consideration by the control algorithm, and which are preferably continuously updated to achieve optimal induction to the sorter with optimal utilization of the capacity of the robot(s) and the sorter system. E.g. with the use of position and velocity of an empty space on the sorter, it is possible to calculate, based on inputs of current 3D position of the first robot, and with information regarding its maximum speed of movement, whether the first robot is capable of placing an item picked up, on the empty space on the sorter or not. If it is determined to be possible, then the control algorithm may control the first robot to do so.

The control algorithm may be arranged to generate the output, in response to said input parameters, indicating to place an item on a second induction arranged for transporting items to the sorter, and within the reach of the first robot. Further, the first robot, and possibly more robots, may have a capacity to reach three or even more inductions. In such cases, the control algorithm may be arranged to take into account such further inductions in the selection of where the robot should place an item. This allows the control algorithm to select to place an item on the second induction, or on one of further available inductions, in case it receives information that there is no empty space on the sorter within the reach, and if there is no empty space on the first induction, or on a weighing unit adjacent thereto.

As already mentioned, the first robot may be arranged to singulate items arriving at the feeding conveyor. The control algorithm may be arranged to control the first robot to do so, e.g. in case a person and/or an additional robot handles items downstream of the robot.

The control algorithm may be arranged to generate an output, in response to said input parameters, indicating that the first robot should let an item pass by on the feeding conveyor without picking it up. This may be selected by the control algorithm, e.g. in case it has been determined that the first robot is capable of effectively handling one or more other items, e.g. placing them directly on empty spaces on the sorter, but then not leaving time for handling all items arriving at the feeding conveyor.

The method may further comprise manually picking up an item from the feeding conveyor at a position downstream of the first robot for manually inducting the item on the sorter or for performing other processing of the item. Hereby, one or more robots can be used with a limited capacity in combination with person(s) manually handling items which the first robot is not capable of handling, and/or manually handling special items which can not be picked up by the robot.

The method may comprise providing a second robot arranged to pick up an item from the feeding conveyor in accordance with a second output from the control algorithm. Especially, the control algorithm may be arranged to generate the second output in response to an activity of the first robot. This can provide effective cooperation between two robots, e.g. to ensure that the robots do not collide in case their reaching ranges overlap, and e.g. to ensure that the robots do not try to pick up the same item or try to place an item on one place simultaneously. In some cases the control algorithm may be arranged to allocate special tasks to one of the robots, e.g. controlling the first robot to singulate bulk items on the feeding conveyor, to facilitate the picking up task for the second robot downstream of the first robot.

The control algorithm may be arranged to determine, in response to at least one input, if the first robot is able to place an item on an empty space on the sorter, and to control the first robot accordingly. In a specific embodiment of the control algorithm, it may be a highest priority for the first robot to directly place an item picked up on an empty space on the sorter, since this can be used to reduce the number of inductions necessary to obtain a desired induction capacity to the sorter. The control algorithm may especially be arranged to calculate if the first robot has sufficient time to reach the position of the empty space on the sorter and deliver the item at a relative velocity to the sorter velocity being close to zero, or at least with a relative speed close to zero. In response to such calculation result, the control algorithm may determine whether to place the item directly on the sorter, or e.g. on an induction. Thus, the control algorithm may be arranged to control the first robot, so as to place an item on an empty space on the sorter with a relative velocity to said empty space being below a predetermined threshold. Especially, the control algorithm may be arranged to calculate if the first robot is able to place an item on an empty space on the sorter or the first induction with a relative velocity being below said predetermined threshold.

The control algorithm may be arranged to determine, in response to at least one input, if the first robot is able to place an item on an empty space on the first induction or on a weighing unit, and to control the first robot accordingly. Such determination can be based on input regarding if there currently is an empty space on the induction or on a weighing unit adjacent to the induction, and the determination can include calculating whether the first robot has sufficient time to reach the empty space, e.g. based on input regarding the amount of further items arriving on the feeding conveyor. Further, in case of additional robots within the reach of the first induction, the control algorithm may decide which of the robots to place an item on an empty space on the first induction.

It is to be understood, that the stream of items arriving at the feeding conveyor may comprise at least one of: 1) bulk items, 2) singulated items (i.e. in one layer), 3) singulated and aligned items, and 4) singulated, aligned, and oriented items. Especially, the stream of items may be a mix of all of the four mentioned 1)-4), wherein the first robot and the control algorithm are arranged for identifying individual items and handling pick up of the items whether arriving singulated or as bulk items. In principle, all types of items can be handled, if the first robot is designed to pick up and move the type of items which can be of various shapes, sizes, and with various surface characteristics. Especially, the stream of items arriving at the feeding conveyor may comprise at least one of: mail pieces, parcels, baggage, items handled at a warehouse distribution, and items handled at a mail order distribution centre, such as shoes, clothes, textiles etc. Especially, the items may have a maximum weight of 1-100 kg, such as 1-10 kg, such as a maximum weight of 2-3 kg. Such items with a maximum weight of 2-3 kg can be picked up and moved at a high speed even with moderately sized robots.

The control algorithm may be arranged to generate said output indicating where to place an item, in response to a predetermined priority list of places. In certain sorter systems, it may be of highest priority to place items directly on an empty space on the sorter, if possible. The control algorithm may be arranged to dynamically update such priority list of places, e.g. in response to an activity of one or more additional robots, e.g. additionally or alternatively in response to the information regarding the stream of items arriving at the feeding conveyor. Especially, the control algorithm may be arranged to determine at which places the first robot is able to place an item, and to select among these, a highest priority on the priority list of places, and to control the first robot accordingly.

In a second aspect, the invention provides a system comprising
- at least one feeding conveyor arranged to transport a stream of items,
- at least one sorter,
- at least a first induction arranged for transporting items to the sorter,
- at least a first robot arranged to pick up an item from the feeding conveyor, and to place the item according to a control input, and
- at least one processor arranged to process input parameters according to a control algorithm, and to generate a control output to control the first robot in accordance with the method of the first aspect.

The system may comprise at least one vision based system serving to provide input to the control algorithm. E.g. such vision based system may provide the information to the control algorithm regarding the stream of items arriving at the feeding conveyor, e.g. based on a camera and related imaging processing means set up to monitor items arriving at the feeding conveyor upstream of a position of the first robot.

Other types of sensors may be used in addition to or alternative to vision based systems, to provide input to the control algorithm with respect to information regarding the stream of items arriving at the feeding conveyor. Further, vision based systems and/or other types of sensors may be used in addition to provide information regarding other activities in the sorter system which can be used by the control algorithm in order to provide efficient control of the first robot, and possibly additional robots. Such sensors may in principle be any type of sensor that can provide any information regarding traffic of items in a sorter system. E.g. such information may include a rate (number of items per time) of incoming items in the stream of items arriving at the feeding conveyor, or a simple sensor arranged to sense if there is an item or not on a weighing unit, or on an induction.

The control algorithm may be arranged to receive at least one input parameter from a control system controlling the sorter and/or the first induction. Thus, in practical implementations, the processor may be connected to at least one of: a control system serving to control the sorter, a control system serving to control the first induction, and possibly more inductions, and a control system serving to control the feeding conveyor, and possibly more feeding conveyors, and wherein the processor is arranged to receive input to the control algorithm therefrom. The control algorithm may in this way receive data output from the sorter control system and/or induction control system, e.g. including information regarding empty spaces, actual speed. E.g. such data may include data related to empty spaces on the sorter which are temporally well ahead of positions on the sorter within the reach of the first robot, however such data will enable the control algorithm to plan the operation of the first robot. E.g. if a number of adjacent empty spaces on the sorter are coming up, the first robot may be controlled to perform singulating of items arriving at the feeding conveyor, in order to prepare a faster picking up and moving of items, thus allowing the second robot, or possibly further robots, to be able to fill items in the upcoming adjacent empty spaces on the sorter.

The first robot may be positioned within the reach of all of: the feeding conveyor, the sorter, and the first induction. Alternatively, the first robot, and possibly further robots, may be positioned within the reach of all of: the sorter, two or more feeding conveyors, and the first induction, and possibly one or more further inductions. However, in some applications, it may be required that the first robot is within the reach of the feeding conveyor and the first induction, e.g. within the reach of the feeding conveyor and a plurality of inductions. In other embodiments, the first robot may only be within the reach of the feeding conveyor and the sorter, and thus out of reach of any induction or weighing unit.

The first robot may be controlled such that it can let an item pass by on the feeding conveyor if a predetermined criterion is fulfilled. E.g. if it has been identified that the first robot is not capable of picking up a specific item, the item can be passed on to another robot, or it can be manually handled. In other cases, if the control algorithm has determined that the first robot can more effectively handle other items, e.g. take the time to place them directly on the sorter, the control algorithm may determine that the first robot should skip handling one or more specific items. Still further, the amount of incoming items at the feeding conveyor may exceed the capacity of the first robot.

The system may comprise a second robot positioned within the reach of the feeding conveyor and at least one of: the first induction, and the sorter. Such second robot may be positioned such that its reaching range overlaps with a reaching range of the first robot, or the two robots may be positioned out of reach of each other. Especially, the system may comprise a plurality, e.g. 4-20 or even more, similar or different robots positioned at respective positions along one common feeding conveyor, or they may be positioned adjacent to respective separate feeding conveyors. Each of the plurality of robots may each be capable of reaching two or more inductions, and/or a second feeding conveyor.

The first robot may comprise a robotic manipulator arm comprising at least two joints or axes, e.g. the manipulator arm comprises three or more joints. The joints may be rotational joints or a combination of hinges and rotational joints. In preferred versions, the first robot comprises a base, wherein the manipulator arm extends from the base. Especially, the base may be mountable fixed to a floor. Preferably, the robotic manipulator arm has an extension making it capable of placing an item at least a horizontal distance of 1 meter away from where it has picked up the item.

The sorter may comprise a plurality of supporting surfaces arranged to move along a track in a transporting direction, wherein the supporting surfaces define empty spaces for receiving and transporting items. However, it is to be understood that the sorter may be of a type as for example: a tilt-tray sorter, a cross-belt sorter, a tote based sorter, a pusher sorter, a shoe sorter, or a pop-up sorter. Especially, the sorter may be a closed loop type of sorter. Especially, the sorter may be arranged to transport items with a speed of at least 0.4 m/s, such as 0.5-1.0 m/s, such as 1.0-1.5 m/s, such as 1.5-2.0 m/s, such as more than 2.0 m/s. Especially, the sorter may be arranged to transport items at a constant speed.

The system may further comprise a plurality of discharges arranged for receiving items from the sorter, wherein the discharges are arranged at different positions adjacent to the sorter.

The system is arranged to discharge items from the sorter at discharge locations selected in accordance with an identification code associated with the individual items. E.g. such identification code can be such as: a bar code, a postal code, an ID tag, RFID tag, or the like. By scanning the identification code of an item, the sorter system is capable of sorting the item accordingly.

The first induction may be arranged to receive an item in one end and to accelerate the item so as to deliver the item in an empty space on the sorter with a relative velocity to a velocity of the empty space on the sorter, wherein said relative velocity is below a predetermined threshold. Especially, the system may comprise a weighing unit positioned adjacent to one end of the induction.

It is understood that the function of processor can be implemented in various ways. The processor may be a computerized controller including a digital processor executing the control algorithm which is implemented in software, so as to allow easy updating and adaptation of the function of the system, e.g. by changes in sorter and induction configuration, and by including more robots to the system which need to be controlled in order to most effectively cooperate to handle the incoming stream of items. In some embodiments, the processor can be implemented by means of a Programmable Logic Controller (PLC). The processor may be a dedicated robot controlling processor, or it may be implemented as part of or sharing the processor serving to control the sorter. Hereby, the addition of one or more robots to an existing sorter system may be implemented with a minimum of extra hardware for controlling the robot(s), and thus in such implementations, the program code for controlling the robot(s) can be implemented purely as processor executable program code. Likewise, the processor may be implemented as part of or sharing the processor serving to control the one or more induction for transporting items to the sorter. Still further, the processor may be implemented as part of or sharing the processor serving to control the feeding conveyor, which may be advantageous in case the robot(s) are intended to singulate items arriving at the feeding conveyor prior to picking up the items for placing on the induction(s) or the sorter. Yet other versions may have separate robot controls with interfaces to one common machine controller for controlling sorter, inductions and feeding conveyor(s). The machine controller may then have an interface to an overall system controller, which may have an interface to an ever higher order control, e.g. a Warehouse Management System (WMS).

In a third aspect, the invention provides use of a system according to the second aspect for sorting mail items in a mail sorting centre. More specifically, the system may be used for sorting rest mail items in a mail sorting centre.

In a fourth aspect, the invention provides a processor executable program code arranged to perform the method according to the first aspect. Especially, the processor executable program code may be present on a non-transitory computer readable storage medium.

It is appreciated that the same advantages and embodiments described for the first aspect apply as well for the second, third and fourth aspects. Further, it is appreciated that the described embodiments can be intermixed in any way between the mentioned aspects.

BRIEF DESCRIPTION OF THE FIGURES

The invention will now be described in more detail with reference to embodiments and regard to the accompanying figures of such embodiments, of which

The figures illustrate specific ways of implementing the present invention and are not to be construed as being limiting to other possible embodiments falling within the scope of the attached claim set.

DETAILED DESCRIPTION OF EMBODIMENTS

Figure 1:
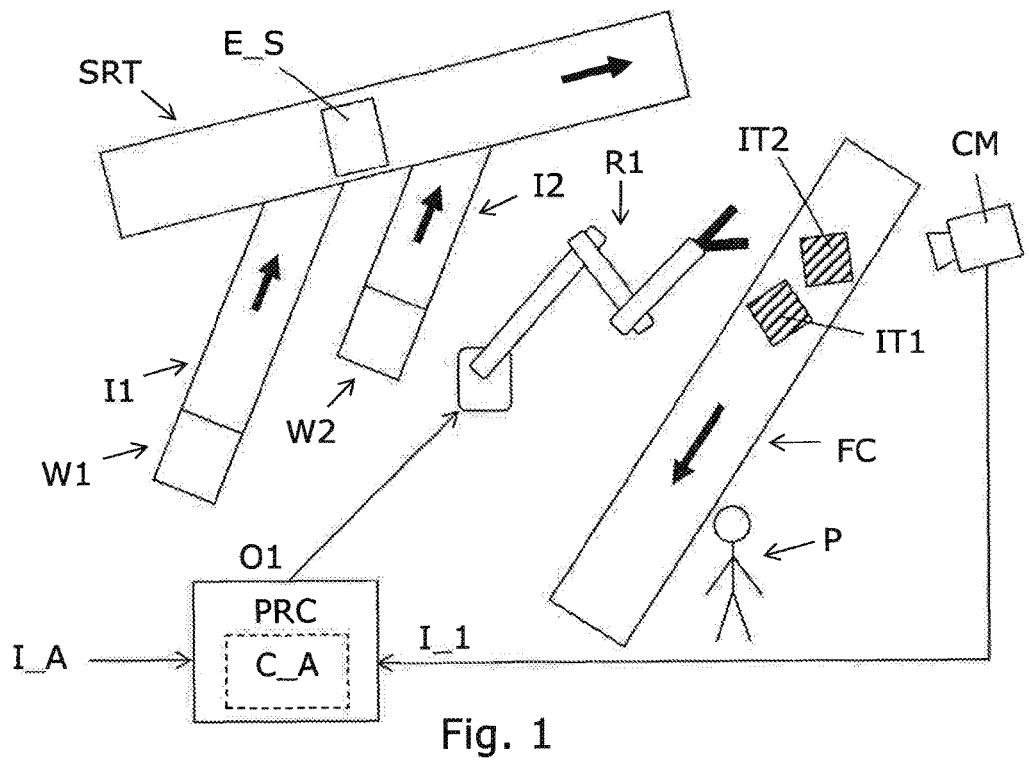
FIG. 1 illustrates a block diagram of a system embodiment with one robot.

FIG. 1 illustrates a block diagram of a sorter system embodiment with one single robot R1. The robot R1 is illustrated with its manipulator arm connected to a fixed base in one end, and with a grab for picking up items in the opposite end. The manipulator arm is illustrated with altogether 4 joints or axes, however it is understood that many other manipulator arm configurations can be used as well, depending e.g. on the size and weight of items to be handled, and on the required reaching range. The robot R1 is positioned such that both a feeding conveyor FC, a sorter SRT, and two inductions I1, I2 as well as two weighing units W1, W2 (positioned at respective input ends of the inductions I1, I2) are all within the reaching range of the robot R1. An empty space E_S not yet occupied by an item is indicated on the sorter SRT.

For simplicity of illustration, only parts of the sorter SRT and the feeding conveyor FC are shown, however both of these may e.g. be closed loop type of conveyor systems. Further, it is to be understood that in practical implementations, the configuration of feeding conveyor FC, sorter SRT, inductions I1, I2 etc. may be quite different from the sketched embodiment. The bold arrows indicate transporting directions of the sorter SRT, inductions I1, I2, and feeding conveyor FC. A stream of items arrive at the feeding conveyor FR, here as two items IT1, IT2 which are approaching the position of the robot R1 in the illustration. The items IT1, IT2 are shown as singulated items but non-aligned and non-oriented items, however the stream of items IT1, IT2 may include bulk items as well, where the role of the robot R1 may be to singulate the items IT1, IT2 prior to picking up and moving the items IT1, IT2.

The robot R1 is controlled by a processor PRC which generates an output O1 for controlling the robot R1. The processor PRC receives a plurality of input parameters which are processed in a control algorithm. Some input parameters are predefined parameters e.g. regarding the physical configuration of the robot R1 in relation to the sorter SRT, inductions I1, I2 arranged for transporting items to the sorter SRT, weighing units W1, W2, and feeding conveyor FC. Some input parameters are dynamically updated based on the current activity sensed at various parts of the system, e.g. the input I_1 regarding incoming items IT1, IT2, here as an input from a camera CM based vision system.

Especially, the input parameters comprise information I_1 regarding the stream of items arriving at the feeding conveyor FC. This information is provided in the embodiment by a vision based system with a camera CM monitoring activity on the feeding conveyor FC upstream of where the robot R1 is positioned. The camera CM may be able to simply inform the control algorithm about the number of single items upstream of the robot R1. However, the vision based system may be able to provide image processing that allows a more detailed information about arriving items IT1, IT2, e.g. if bulk items arrive or not, which may influence the preferred function of the robot R1 and thus be used as input to the control algorithm C_A. Further, in applications where different types and sizes of items IT1, IT2 can be expected, the vision based system may be capable of providing information about the type of items arriving as input to the control algorithm C_A, since this may also be used as input to the control of the robot R1. E.g. an estimated weight of an item IT1 may be provided by the vision based system, which may influence the time required for the robot R1 to pick-and-place the item IT1, and this can be taken into account in the control algorithm C_A.

In addition, an additional input I_A to the processor PRC is illustrated. This additional input I_A may include information from the sorter system regarding position of one or more empty spaces E_S on the sorter, as well as a number of further inputs. In case of more robots in the system, the control algorithm C_A should also take into account an input regarding the current and planned activity of at least a neighbouring robot, so as to avoid e.g. that two robots try to pick up the same item IT1, or that two robots try to place an item IT1 at the same single empty space E_S.

The processor PRC processes these inputs I_1, I_A in the control algorithm C_A, and in response, the control algorithm C_A generates an output O1 indicating where to place an item picked up by the robot R1. Accordingly, the robot R1 is controlled to pick up an item from the feeding conveyor FC, and to place the item in accordance with the output O1 of the control algorithm. Further type of additional inputs I_A may be information about empty spaces on the two inductions I1, I2, and on the two weighing units W1, W2.

The control algorithm C_A selects between different places where the robot R1 is to place an item picked up, at least the control algorithm C_A is arranged to select between two of:

1) a first induction I1 arranged for transporting items to the sorter,
2) an empty space E_S on the sorter SRT,
3) the feeding conveyor FC, but at a different position and/or orientation than where it was picked up, e.g. singulating items IT1, IT2 on the feeding conveyor, and
4) a weighing unit W1 arranged for weighing items.

Especially, the control algorithm C_A may be arranged to select between all of the four mentioned places, and further the second induction I2, and the second weighing unit W2 may also be selectable options.

Still further, the control algorithm C_A may be arranged to decide to let an item IT1 pass by on the feeding conveyor FC, based on the inputs I_1, I_A. This may be based on the input I_1 regarding the stream of arriving items IT1, IT2 that the control algorithm C_A has determined that the robot R1 is not capable of picking and moving all incoming items IT1, IT2, and thus the control algorithm C_A may control the robot R1 such that it lets the item IT1 pass by for manual handling by a person P downstream of the feeding conveyor, or by an additional robot positioned downstream of the robot R1.

The control algorithm C_A can be rather complicated, in case many inputs are taken into account, and the decision where to place an item picked up by the robot may comprise a number of calculations taking into account the speed capacity of the robot R1, i.e. whether the robot R1 has sufficient time to place an item IT1 at a desired place or not.

E.g. the control algorithm C_A may select from a priority list of places. E.g. it may be a highest priority to place items directly on an empty space on the sorter SRT, however it may be calculated that it is not possible for the robot R1 to move fast enough to be able to place the item IT1 at a sufficient low relative velocity on the empty space E_S on the sorter SRT, in case the speed of the sorter is high. Thus, it may be decided to place the item IT1 on an induction I2 instead, since an input I_A indicates that there is an empty space there.

The robot R1 and the control algorithm C_A can be considered as a part of the induction mechanism for inducting items on the sorter SRT.

Especially, the sorter system may be used for sorting rest mail in a mail sorting centre. However, bigger or smaller items than mail may be handled as well with the use of suitable robots, preferably capable of identifying, picking up, and moving items of the type in question.

Figure 2:
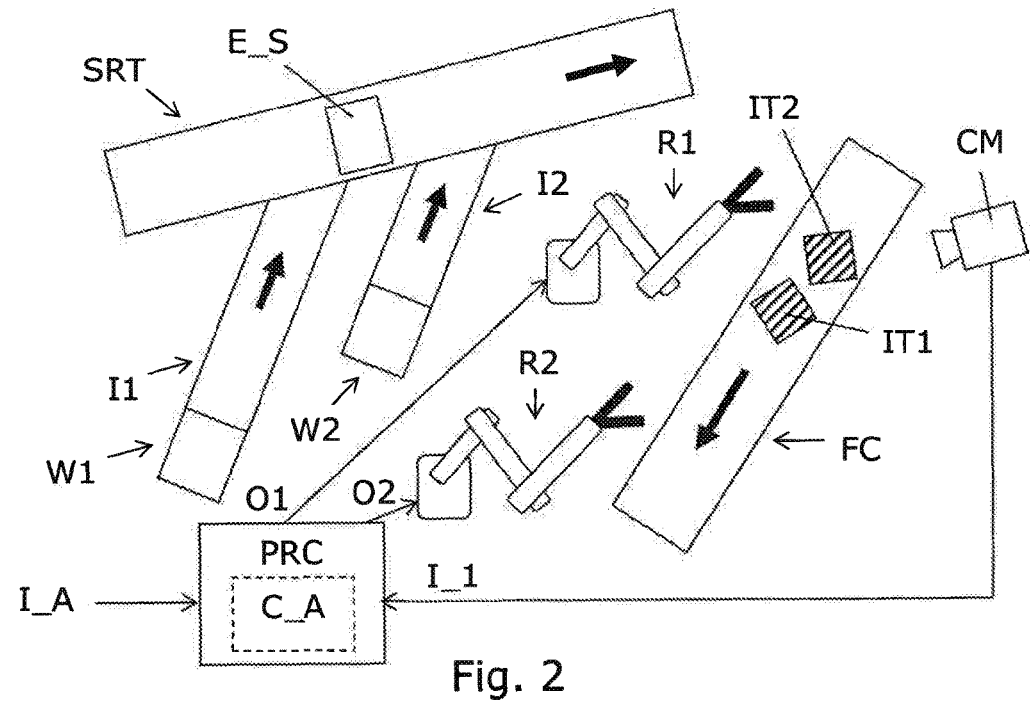
FIG. 2 illustrates a block diagram of a system embodiment with two robots.

FIG. 2 illustrates basically the same sorter system as in FIG. 1, and thus the above description of the single parts apply as well for FIG. 2. However, in the embodiment of FIG. 2, there are two robots R1, R2 controlled by respective outputs O1, O2 by the processor PRC. Thus, the control algorithm C_A is arranged to control both robots R1, R2. Further, in the embodiment of FIG. 2 there is no person for manual handling of the items IT1, IT2.

By having only one control algorithm C_A for controlling both robots R1, R2, it is ensured that the control algorithm C_A can take into account the activity of both robots R1, R2, thus ensuring that a collision will not happen, even though the reaching ranges of the two robots R1, R2 overlap. Even further, it may be possible to define a control algorithm C_A such that it is possible to provide a synergistic effect between the two robots R1, R2. E.g. the control algorithm C_A may decide that the first robot R1 should singulate incoming bulk items instead of picking and moving them, and thus allow the second R2 to pick and move at a higher speed, since it receives singulated items instead of bulk items.

Especially, the two robots R1, R2 may be identical robots. However, in applications where significantly different items can be expected, the vision based system, based on input from the camera CM, may be capable of providing input to the control algorithm C_A regarding characteristics of items arriving on the feeding conveyor FC. E.g. the first robot R1 can only handle items up to a certain size, while the second robot R2 can handle larger items, thus in such case, the control algorithm C_A can be arranged to control the robots R1, R2 such that an item larger than a predefined size is skipped by the first robot R1, such that it can be handled by the second robot R2. In this manner, two or more robots of different types may cooperate in handling items with different characteristics, based on input to the control algorithm C_A regarding characteristics of arriving items.

Figure 3:
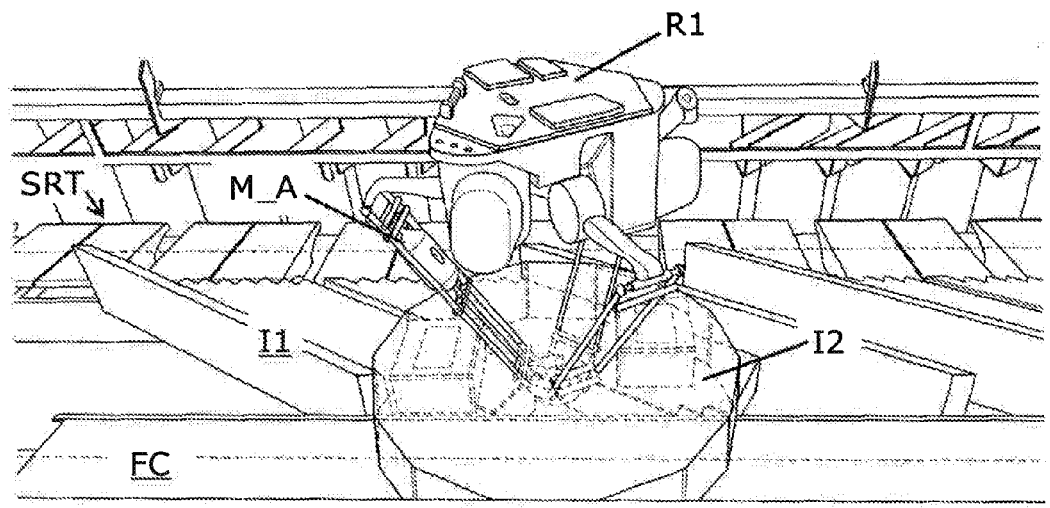
FIGS. 3 and 4 illustrate two different views of a robot placed in a sorter system embodiment.
Figure 4:
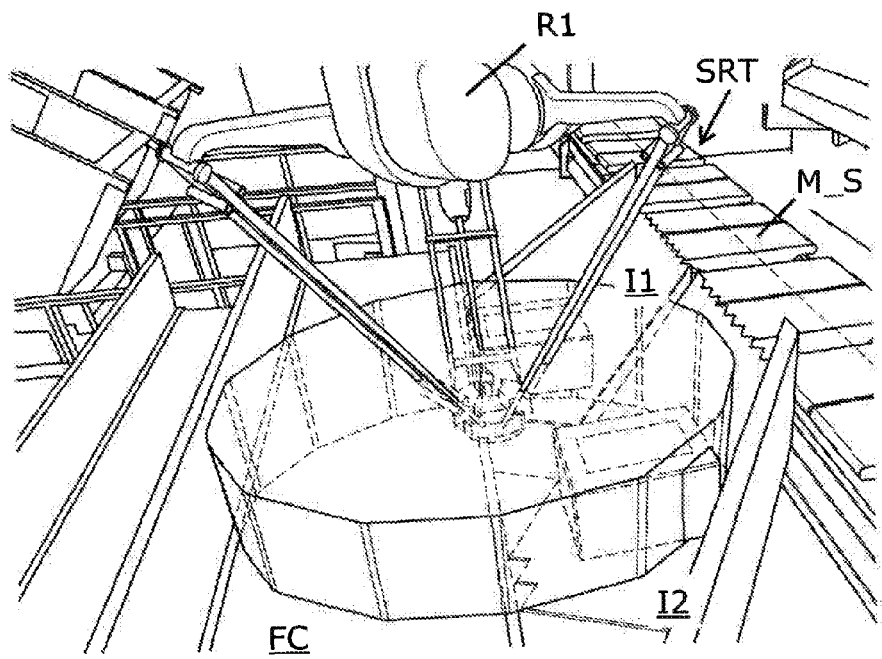

FIGS. 3 and 4 show two views of various parts of a robot R1 in a sorter system embodiment, where a sorter SRT, e.g. a closed loop sorter, is loaded with items via two inductions I1, I2, and where items are discharged at discharges (not shown) positioned at different positions adjacent to the sorter SRT. The illustrated sorter system may e.g. be used as part of a system for sorting mail, e.g. rest mail, in a mail sorting centre.

FIG. 3 shows a sketch of one robot R1, the specific type pick-and-place robot R1 manufactured by the company Omron™, and the manipulator arm M_A of the robot R1 has a reaching range indicated as an encircled area. The reaching range is seen to cover the feeding conveyor FC, and two inductions I1, I2. In case the robot R1 was selected with a larger reaching range, it could also be controlled to place items directly on the sorter SRT, or it could be controlled to place items on one or more further inductions, as described in the foregoing.

In the illustrated configuration, the feeding conveyor FC runs in parallel with the sorter SRT, with the inductions I1, I2 placed between the feeding conveyor FC and the sorter SRT. The inductions I1, I2 are angled in relation to a transporting direction of the sorter SRT to be able to accelerate items for delivery of the item on the sorter SRT at zero or at least a low relative velocity compared to a transporting velocity of the sorter SRT. The robot R1 is placed in an area above the feeding conveyor FC, and it is indicated that the robot R1 is mounted to a structure placed above the vertical level of the feeding conveyor FC and the sorter SRT, e.g. to a ceiling structure.

The robot R1 can pick up an item and place it on either one of the two inductions I1, I2. The inductions I1, I2 include conveyors that transport an item placed thereon to the sorter SRT. As a further option, the robot R1 may be controlled to let an item on the feeding conveyor FC pass by without picking it up. Still further, the robot R1 may be controlled to singulate bulk items arriving on the feeding conveyor FC. Thus, the robot R1 may either place an item picked up from the feeding conveyor FC:
1) on the feeding conveyor FC, but at another position and/or orientation than where it was picked up, preferably performing a singulation of items
2) on the first induction I1, or
3) on the second induction I2.

Alternatively, it can be controlled to skip picking up an arriving item, or it can be controlled to place an item directly on the sorter, as mentioned.

The robot R1 itself is capable of identifying an upper most item from a bulk of items, and comprises gripping means for gripping the item. A control system with a control algorithm serves to control where the robot R1 places an item picked up. The squared dashed boxes serve to indicate where on the inductions I2, I2, the robot R is programmed to place the item.

FIG. 4 shows the robot R1, the feeding conveyor FC, the two inductions I1, I2 and the sorter SRT from another viewing angle. Especially, it can be seen that the sorter SRT comprises a line of moving supporting surfaces M_S for receiving items, and thus the inductions I1, I2 are programmed to accelerate items up to the speed of the moving supporting surfaces M_S, so at to place an item on a moving supporting surface M_S of the sorter SRT with zero relative velocity, or at least a low relative velocity to prevent items falling off the moving supporting surface M_S. The same applies to embodiments where the robot R1 is selected to have a reaching range that makes it capable of directly placing items on the moving supporting surface M_S of the sorter SRT. Here, the robot R1 is preferably programmed to place an item on a moving supporting structure M_S with a relative velocity below a predetermined threshold value, preferably as close to zero as possible, however preferably below a predetermined value selected based on the type of items handled and other parameters.

Figure 5:
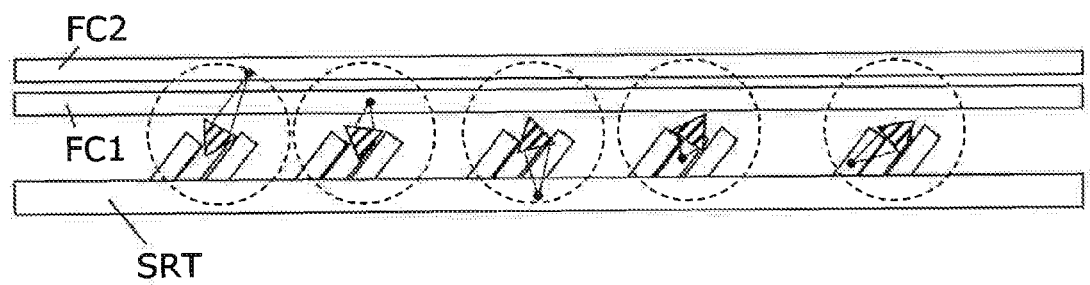
FIG. 5 illustrates a sketch of a sorter system embodiment with five robots.

FIG. 5 shows a sketch of an example of a sorter system seen from above. The system comprises a sorter SRT with a plurality of associated inductions, two feeding conveyors FC1, FC2, and a plurality of robots at different positions between the feeding conveyors FC1, FC2 and the sorter SRT. Five robots are visible and indicated with hatched triangles and lines indicating their manipulator arms. The dashed circles indicate the reaching range of the robots, and as seen, all of the five robots can reach both of the two feeding conveyors FC1, FC2, three inductions, and the sorter SRT. The five robots are illustrated with their manipulator arms at different positions.

A control system with a control algorithm serves to control each of the five robots, i.e. determine from which feeding conveyor FC1, FC2 an item should be picked up by each robot, and to determine if the robot should place the item on: 1) the sorter SRT, 2) a first induction, 3) a second induction, 4) a third induction, or 5) perform a singulation of items on one of the feeding conveyors FC1, FC2. Preferably, the control algorithm serves to control each of the robots taking into account activities of the other robots, so as to most effectively handle the incoming stream of items on the feeding conveyors FC1, FC2. E.g. the role of one or two upstream robots may primarily be to singulate items on the feeding conveyors FC1, FC2, in case of incoming bulk items, so as to facilitate the pick-and-place task for the downstream robots.

Figure 6:
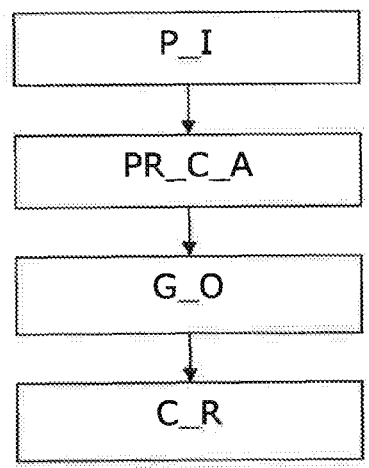
FIG. 6 illustrates a block diagram of a method embodiment.

FIG. 6 shows a flow diagram of basic parts of an induction method embodiment for inducting an item to a sorter from a stream of items arriving at a feeding conveyor. A first step comprises providing a plurality of input parameters P_I, where the input parameters comprise at least information regarding the stream of items arriving at the feeding conveyor.

The input parameters are preferably received by a processor as data in digital or analog form, e.g. at regular time intervals or on request by the processor. These input data are then converted to respective parameter values for processing in the control program. Next step is the processing of the input parameters in the processor according to a control algorithm PR_C_A, preferably in the form of a preprogrammed code arranged for execution on the processor, e.g. the processor is part of a computer or Programmable Logic Controller (PLC) system. The control algorithm performs a number of calculations based on predefined algorithm parts taking the input parameters as input, and based on the calculation results of these predefined algorithm parts, the control algorithm arrives at determining where the robot is to place an item picked up. The control algorithm performs a selection between at least two of, e.g. all of:
1) a first induction arranged for transporting items to the sorter,
2) an empty space on the sorter,
3) the feeding conveyor, but at a different position and/or orientation than where it was picked up, e.g. singulating items on the feeding conveyor, and
4) a weighing unit arranged for weighing items.

Next step is generating an output G_O from the control algorithm indicating where the robot is to place an item picked up. The final step is controlling the robot C_R according to the output of the control algorithm, i.e. causing the robot to place an item picked up from the feeding conveyor on the place determined by the control algorithm, e.g. directly on an empty space on the sorter, or on a first induction.

The method can be implemented as program code, and in practice the program code may be partly or fully integrated with existing systems for controlling a sorter and induction system based on manual picking and moving from a feeding conveyor to an induction.

To sum up: the invention provides a method and a system for inducting items to a sorter SRT from a stream of items IT1, IT2, e.g. mail or parcels, arriving at a feeding conveyor FC. A processor PCR executes a control algorithm C_A with at least information I_1 regarding the stream of items arriving at the feeding conveyor FC as input. In response, the control algorithm C_A generates an output O1 indicating where to place an item picked up by a robot R1 from the feeding conveyor FC. The control algorithm C_A selects between two or more of: 1) a first induction I1 arranged for transporting items to the sorter SRT, 2) an empty space E_S on the sorter SRT, 3) the feeding conveyor FC, e.g. singulating bulk items on the feeding conveyor FC, and 4) a weighing unit W1 arranged for weighing items. By controlling the robot R1 accordingly, it is possible to provide effective use of existing pick-and-place robots as part of a sorter induction system, where a high capacity can be obtained with a small requirement for space. E.g. it may be possible to save space for inductions, compared to what is required for manual handling with the same sorting capacity, especially this may be advantageous for items with a maximum weight of 2-3 kg.

Although the present invention has been described in connection with the specified embodiments, it should not be construed as being in any way limited to the presented examples. The scope of the present invention is to be interpreted in the light of the accompanying claim set. In the context of the claims, the terms "including" or "includes" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method of inducting items to a sorter from a stream of items arriving at a feeding conveyor, the method comprising:
   providing a plurality of input parameters comprising at least information regarding the stream of items arriving at the feeding conveyor,
   processing said input parameters in a processor according to a control algorithm, wherein the control algorithm is configured to generate at least one output, in response to said input parameters, indicating where to place an item, selecting between at least two of:
      a first induction arranged for transporting items to the sorter,
      an empty space on the sorter,
      the feeding conveyor, but at a different position and/or orientation than where it was picked up, and
      a weighing unit configured to weigh items, and
   controlling at least a first robot in accordance with the output of the control algorithm, wherein the first robot is configured to pick up an item from the feeding conveyor, and to place the item in accordance with the output of the control algorithm.

2. The method according to claim 1, comprising selecting an item to be picked up by the first robot, from a plurality of items available on the feeding conveyor, in response to the plurality of input parameters.

3. The method according to claim 1, wherein the plurality of input parameters further comprise at least one of:
   information regarding an empty space on the sorter,
   information regarding an empty space for at least one item on the first induction,
   information regarding an empty space for at least one item on a second induction, information regarding characteristics of the one or more items arriving on the feeding conveyor, wherein the characteristics comprise at least one of: a shape, a weight, a size, a center of gravity, an orientation, a surface property, or whether or not the item is a top most item in a bulk, information indicative of a position of an empty space on the sorter, or information indicative of a velocity of an empty space on the sorter.

4. The method according to claim 1, wherein the control algorithm is configured to generate the output, in response to said input parameters, indicating to place an item on a second induction configured to transport items to the sorter, and within the reach of the first robot.

5. The method according to claim 1, wherein at least the first robot is configured to singulate items arriving at the feeding conveyor.

6. The method according to claim 1, wherein the control algorithm is configured to generate an output, in response to said input parameters, indicating that at least the first robot should let an item pass by on the feeding conveyor without picking it up.

7. The method according to claim 1, further comprising manually picking up an item from the feeding conveyor at a position downstream of the first robot for manually inducting the item on the sorter or for performing other processing of the item.

8. The method according to claim 1, wherein the control algorithm is configured to determine, in response to at least one input, if the first robot is able to place an item on an empty space on the sorter, and to control the first robot accordingly.

9. The method according to claim 1, wherein the control algorithm is configured to determine, in response to at least one input, if the first robot is able to place an item on an empty space on the first induction or on the weighing unit, and to control the first robot accordingly.

10. The method according to claim 1, wherein the stream of items arriving at the feeding conveyor comprises at least one of: 1) bulk items, 2) singulated items, 3) singulated and aligned items, and 4) singulated, aligned and oriented items.

11. The method according to claim 1, wherein the stream of items arriving at the feeding conveyor comprises at least one of: mail pieces, parcels, baggage, items handled at a warehouse distribution, or items handled at a mail order distribution centre.

12. The method according to claim 1, comprising providing a second robot that is configured to pick up an item from the feeding conveyor in accordance with a second output from the control algorithm.

13. The method according to claim 12, wherein the control algorithm is configured to generate the second output in response to an activity of the first robot.

14. The method according to claim 1, wherein the control algorithm is configured to control the first robot, so as to place an item on an empty space on the sorter with a relative velocity to said empty space being below a predetermined threshold.

15. The method according to claim 14, wherein the control algorithm is configured to calculate if the first robot is able to place an item on an empty space on the sorter or the first induction with a relative velocity being below said predetermined threshold.

16. The method according to claim 1, wherein the control algorithm is configured to generate said at least one output indicating where to place an item, in response to a predetermined priority list of places.

17. The method according to claim 16, wherein the control algorithm is configured to determine at which places the first robot is able to place an item, and to select among these, a highest priority on the predetermined priority list of places, and to control the first robot accordingly.

18. A system comprising:
at least one feeding conveyor arranged to transport a stream of items,
at least one sorter,
at least a first induction arranged for transporting items to the sorter,
at least a first robot arranged to pick up an item from the feeding conveyor, and to place the item according to a control input, and
at least one processor configured to process input parameters according to a control algorithm, and to generate a control output to control the first robot in accordance with claim 1.

19. The system according to claim 18, comprising at least one vision based system serving to provide input to the control algorithm.

20. The system according to claim 18, wherein the control algorithm is arranged to receive at least one input parameter from at least one of: a control system serving to control the sorter, a control system serving to control at least the first induction, and a control system serving to control the at least one feeding conveyor, and wherein the at least one processor is arranged to receive input to the control algorithm therefrom.

21. The system according to claim 18, wherein the first robot is positioned within the reach of all of: the feeding conveyor, the sorter, and at least the first induction.

22. The system according to claim 18, wherein at least the first robot comprises at least one manipulation arm comprising at least two axes.

23. The system according to claim 18, wherein at least the first robot is controlled such that it can let an item pass by on the feeding conveyor if a predetermined criterion is fulfilled.

24. The system according to claim 18, comprising a second robot positioned within the reach of the feeding conveyor and at least one of: the first induction, and the sorter.

25. A method for sorting mail items in a mail sorting centre comprising sorting mail on the system according to claim 18.

* * * * *